Aug. 4, 1942.  J. BURTON  2,292,046
FITTING FOR USE IN THE ERECTION OF FRAMEWORKS,
SCAFFOLDING, AND OTHER STRUCTURES
Filed July 30, 1940   3 Sheets-Sheet 1
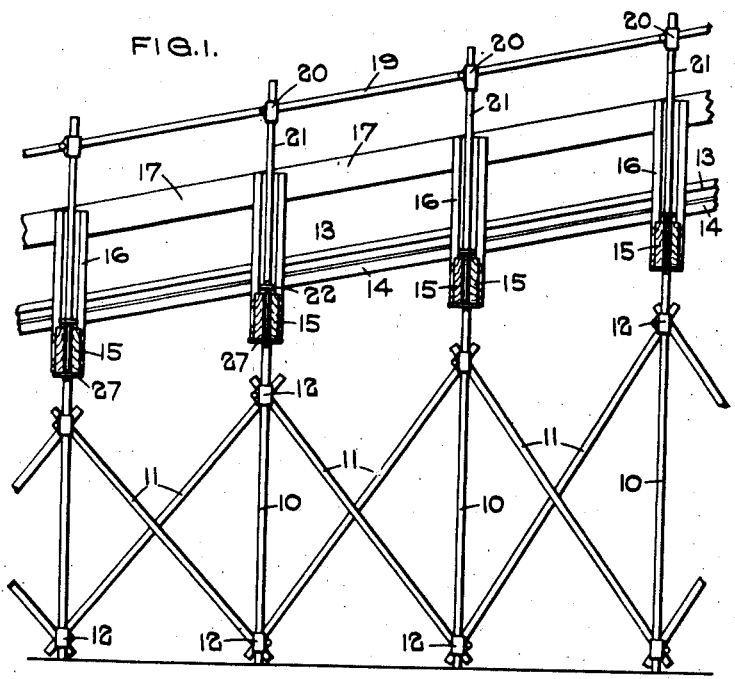
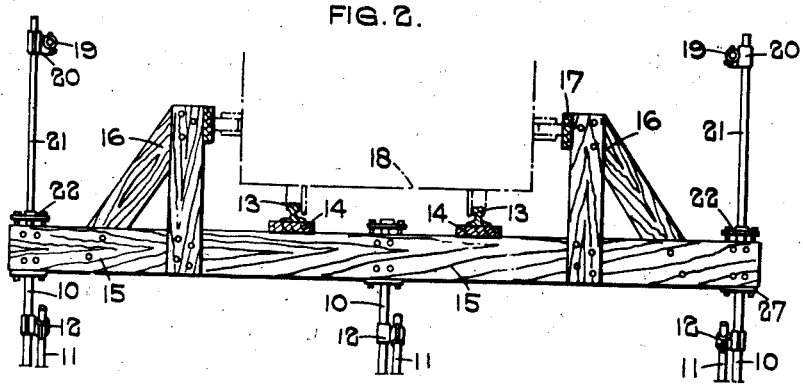
John Burton
Inventor
Taulmin & Taulmin
Attorneys Aug. 4, 1942.    J. BURTON    2,292,046
FITTING FOR USE IN THE ERECTION OF FRAMEWORKS,
SCAFFOLDING, AND OTHER STRUCTURES
Filed July 30, 1940    3 Sheets-Sheet 2
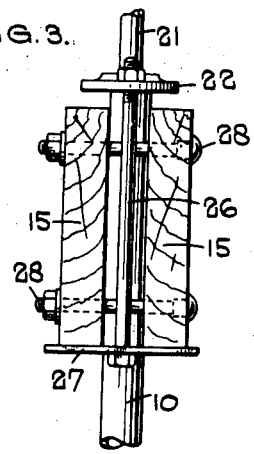
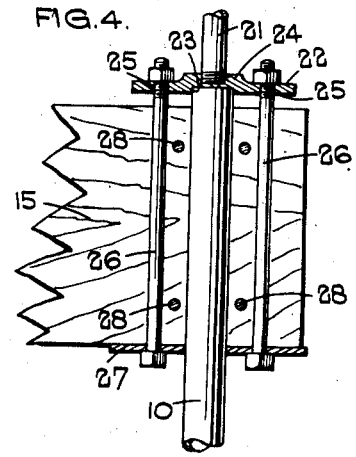
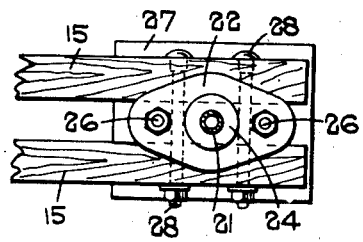
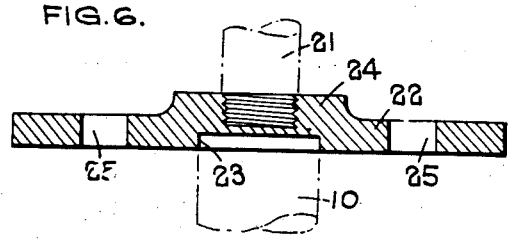
John Burton
Inventor Aug. 4, 1942.          J. BURTON                2,292,046
       FITTING FOR USE IN THE ERECTION OF FRAMEWORKS,
             SCAFFOLDING, AND OTHER STRUCTURES
                Filed July 30, 1940         3 Sheets-Sheet 3
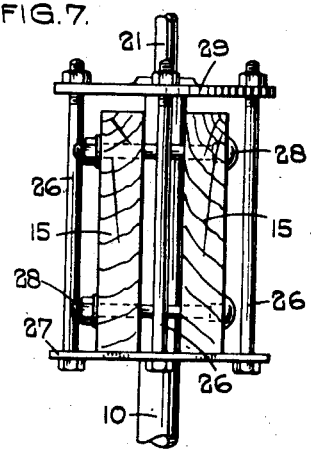
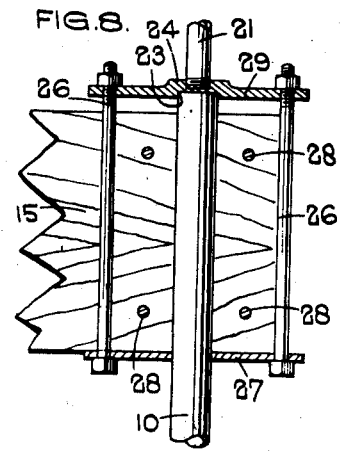
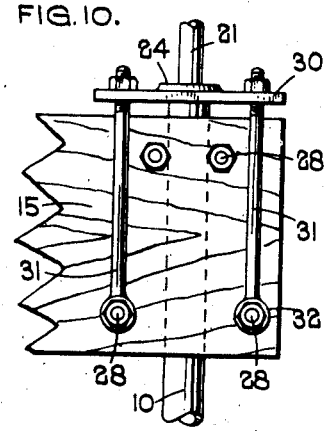
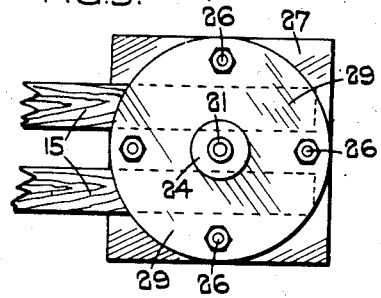
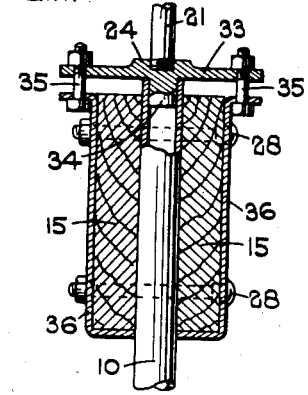
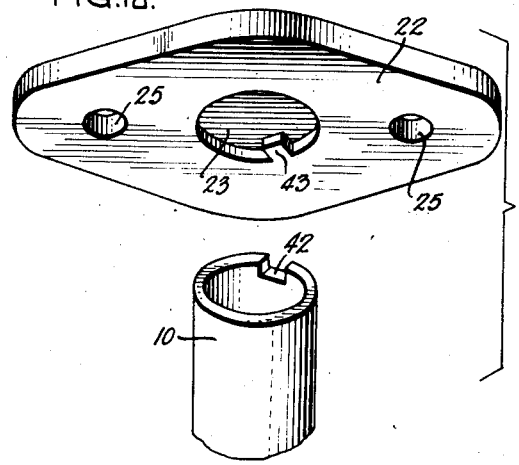
John Burton,
   Inventor Patented Aug. 4, 1942

2,292,046

UNITED STATES PATENT OFFICE 2,292,046

FITTING FOR USE IN THE ERECTION OF FRAMEWORKS, SCAFFOLDING, AND OTHER STRUCTURES

John Burton, Edgbaston, Birmingham, England

Application July 30, 1940, Serial No. 348,528
In Great Britain August 2, 1939

3 Claims. (Cl. 304—40)

This invention relates to fittings for use in the erection of frameworks, scaffolding and other structures and is concerned with fittings for such structures of the type in which a support built up of tubular or like elongated metal members connected together is secured to wooden or other non-metallic members of the structure, the fittings being provided for transmitting the load from the wooden or non-metallic members to the elongated metal members or vice versa.

The invention is particularly suitable for application to the construction of structures such as trestles or bridges supporting railways, roads or other tracks, for example, the scenic railways or gravity rides commonly found in amusement parks.

One of the objects of the present invention is to provide means for effecting positive location between the members to be connected without drilling or machining the metal tubular standards or uprights, thus enabling the structure to be erected, taken down, and re-erected any number of times without skilled labour and without any exact positioning of the uprights in relation to the members to be connected thereto.

A further object of the present invention is to provide means whereby the load is transmitted positively from the members to be supported to the vertical supports of the structure.

According to the present invention in a scaffolding or like structure of the type above referred to the load on the non-metallic members is transmitted to the understructure by means of bearing plates having a non-rocking engagement with the tops of the tubes forming the standards of the understructure.

The bearing plates may be provided with recesses in the underside into which the tops of the tubes forming the standards project, or alternatively the undersides of the bearing plates may be provided with downwardly projecting spigots which engage in the tops of the tubes forming the standards of the understructure.

Further, the non-metallic members to be supported may either rest upon the upper side of each bearing plate, or the bearing plates may be provided with depending bolts carrying a supporting plate at a lower level, and the members to be supported may rest upon the supporting plates.

Further, the members to be supported may be arranged in pairs, one member of each pair being disposed at each side of a tube forming a standard of the understructure, and the pairs of members to be supported may be drawn into pressure engagement with opposite sides of the tubes by means of bolts.

Referring to the drawings:

Figure 1 is a view in side elevation showing a structure in accordance with the present invention.

Figure 2 is an end view.

Figure 3 is a view in side elevation according to one method of construction.

Figure 4 is a corresponding end view partly in section.

Figure 5 is a plan view.

Figure 6 is a sectional view upon an enlarged scale showing one of the bearing plates.

Figure 7 is a view in side elevation showing another construction.

Figure 8 is an end view partly in section.

Figure 9 is a plan view of the construction shown in Figures 7 and 8.

Figure 10 is an end view showing a further construction.

Figure 11 is a sectional view in side elevation showing a further construction.

Figure 12 is a perspective view showing a detail of construction.

In the drawings, Figures 1 and 2 show the general arrangement of the structure, the understructure comprising standard tubes 10 of metal connected by crossed tubes 11 attached to the tubes 10 by means of clamps 12.

The tubes 10 are arranged in pairs at opposite sides of the track 13, and between each pair of tubes 10 there may be a third tube 10 if desired.

The track 13 is supported upon longitudinal members 14 mounted upon cross bearers 15. The bearers 15 are arranged in pairs, one member of each pair being arranged on each side of a tube 10.

The bearers may carry side structures denoted generally at 16, and these side structures may carry side tracks 17 engageable by wheels on the vehicle indicated at 18.

Hand rails 19 may be provided attached by clamps 20 to tubes 21.

The present invention is concerned with the method by which the bearers 15 are mounted upon the standard tubes 10, and in the construction shown in Figures 3 to 6, the top of each of the tubes 10 is provided with a bearing plate 22, this bearing plate having a circular recess on its underside into which the top of the tube 10 projects.

The bearing plate 22 in this construction is of approximately elliptical form and at its centre it has a flange or facing 24 into which is screwed the tube 21 for carrying the hand rail 19.

The bearing plate 22 is provided with bolt holes 25, from which depend the bolts 26 which carry at their lower end a supporting plate 27. The supporting plate 27 is rectangular as shown in Figure 5, and serves to support the members 15 which rest thereon. The members 15 are arranged on opposite sides of the tube 10, and they are drawn towards each other by means of bolts 28 which cause them to grip the tubes frictionally. The load is thus transmitted to the tube 10 partly frictionally and partly through the plate 27, bolts 26 and bearing plate 22.

As will be seen the bolts 26 are arranged between the bearing members and do not pass therethrough.

In the construction shown in Figures 7, 8 and 9, the bearing plate 29 is circular instead of being elliptical and carries four of the depending bolts 26. Two of these are arranged between the bearers 15 and the other two are on the outside thereof. These bolts carry the supporting plate 27 which in this construction is square, and the supporting plate carries the bearers 15 which are drawn together as before by the bolts 28.

In the modification shown in Figure 10, the bearing plate 30 is provided with downwardly projecting bolts 31 which have eyes 32 at their lower ends, and two of the bolts 28 passing through the bearers 15 extend through these eyes. It will be understood that there are two bolts 31 at each side of the pair of bearers. The upper two of the bolts 28 simply pass through the bearers, while the lower two are somewhat longer and pass through the eyes of the bolts 31 in addition to passing through the bearers.

In the modification shown in Figure 11, the bearing plate 33 is provided with a spigot 34 at its underside which engages within the top of the tube 10, otherwise the bearing plate is constructed as already described, and it carries the tube 21 as before.

In this case the bearing plate is provided with depending bolts 35 which carry a U shaped supporting plate 36 within which are mounted the bearers 15. The bolts 28 in this construction passing through the bearers also pass through the sides of the plate 36.

In all the constructions wherein a supporting plate is carried beneath the bearing plate, the supporting plate is provided with an aperture through which the tube 10 extends.

Further, in any of the constructions herein described, means may be provided to prevent the bearing plate at the top of the tube 10 from turning about the axis of the tube. For instance, the top of the tube 10 may be notched as shown at 42 in Figure 12 and the underside of the bearing plate 22 may be provided with a lug 43 for engaging in the notch.

The present invention provides a means of transmitting the load positively from the track bearers to the understructure, and such a construction in the case of a scenic railway or the like is used at those parts of the track where the stresses and shocks are known to be greatest.

Although I have described the invention as applied to the supporting of a track of scenic railway or gravity ride, it should be understood that its application is not limited thereto and that it may be applied also to the connection together of wooden or other non-metallic members with elongated metal members where a load has to be transmitted from one set of members to the other.

What I claim then is:

1. Scaffolding structure comprising spaced pairs of vertical metal tubes forming supports, a bearing plate having a non-rocking engagement with the top of each support tube, bolts depending from said bearer plate, a supporting plate carried by the lower ends of the bolts, the support tube passing through said supporting plate, a pair of bearers arranged on opposite sides of said support tube and resting on said supporting plate, and bolts connecting said bearers without passing through the support tube and drawing said bearers into gripping engagement with said tube.

2. Scaffolding structure comprising spaced pairs of vertical metal tubes forming supports, a bearing plate having a non-rocking engagement with the top of each support tube, bolts depending from said bearer plate, a supporting plate carried by the lower ends of the bolts, the support tube passing through said supporting plate, a pair of bearers arranged on opposite sides of said support tube and resting on said supporting plate, some of said dependent bolts being placed between said bearers and some at the outer sides thereof, and bolts connecting said bearers without passing through the support tube and drawing said bearers into gripping engagement with said tube.

3. Scaffolding structure comprising a vertical metal tube forming a support, a pair of bearers engaging opposite sides of said support tube, bolts connecting said bearers without passing through the support tube and drawing said bearers into gripping engagement with said tube, said engagement locating the bearers and preventing movement thereof horizontally, a bearing plate having a non-rocking engagement with the top of said support tube, supporting means engaging said bearers, and bolts connecting said supporting means with said bearing plate, said bearing plate receiving the downward thrust on said bearers due to the load.

JOHN BURTON.